United States Patent
Kimura et al.

(10) Patent No.: US 7,490,588 B2
(45) Date of Patent: Feb. 17, 2009

(54) VEHICLE CONTROL APPARATUS AND METHOD

(75) Inventors: Shigeru Kimura, Toyota (JP); Toshimitsu Satou, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 11/972,825

(22) Filed: Jan. 11, 2008

(65) Prior Publication Data

US 2008/0168964 A1 Jul. 17, 2008

(30) Foreign Application Priority Data

Jan. 12, 2007 (JP) .............................. 2007-004147

(51) Int. Cl.
F02D 41/12 (2006.01)
B60W 10/04 (2006.01)
B60W 10/10 (2006.01)

(52) U.S. Cl. ................... 123/325; 123/320; 123/332; 477/107; 477/109; 477/901

(58) Field of Classification Search ............... 123/320, 123/325, 332; 477/107, 109, 901
See application file for complete search history.

(56) References Cited

U.S. PATENT DOCUMENTS

| 5,816,979 A | * | 10/1998 | Shiiba et al. ............... 477/176 |
| 5,890,993 A | * | 4/1999 | Horiguchi et al. ............. 477/94 |
| 6,188,316 B1 | * | 2/2001 | Matsuno et al. ............. 340/441 |

FOREIGN PATENT DOCUMENTS

| JP | 6-174074 A | | 6/1994 |
| JP | 06174074 A | * | 6/1994 |
| JP | 6-193491 A | | 7/1994 |
| JP | 2000-154742 A | | 6/2000 |
| JP | 2003-74695 A | | 3/2003 |
| JP | 2005-9510 A | | 1/2005 |

* cited by examiner

Primary Examiner—Anthony L. Bacon
(74) Attorney, Agent, or Firm—Sughrue Mion, PLLC

(57) ABSTRACT

A vehicle control apparatus includes a first fuel-cut duration extending portion that, when a fuel-cut is being executed during deceleration of the vehicle, slows the decrease in the engine speed by executing a slip control of a lock-up clutch; and a second fuel-cut duration extending portion which, when the engine speed has decreased to a coast-downshift threshold, which is higher by a given amount than a fuel-cut cancellation threshold, while the slip control is being executed, allows to downshift the automatic transmission if the road on which the vehicle is presently traveling has a downhill gradient that is larger than a reference value.

10 Claims, 8 Drawing Sheets

|  | C1 | C2 | C3 | C4 | B1 | B2 | F |
|---|---|---|---|---|---|---|---|
| P | × | × | × | × | × | × | × |
| R | × | × | × | ○ | × | ○ | × |
| N | × | × | × | × | × | × | × |
| 1st | ○ | × | × | × | × | ◎ | △ |
| 2nd | ○ | × | × | × | ○ | × | × |
| 3rd | ○ | × | ○ | × | × | × | × |
| 4th | ○ | × | × | ○ | × | × | × |
| 5th | ○ | ○ | × | × | × | × | × |
| 6th | × | ○ | × | ○ | × | × | × |
| 7th | × | ○ | ○ | × | × | × | × |
| 8th | × | ○ | × | × | ○ | × | × |

VEHICLE CONTROL APPARATUS AND METHOD

INCORPORATION BY REFERENCE

The disclosure of Japanese Patent Application No. 2007-004147 filed on Jan. 12, 2007 including the specification, drawings and abstract is incorporated herein by reference in its entirety.

BACKGROUND OF THE INVENTION

1. Field of the Invention

The invention relates to a vehicle control apparatus and a vehicle control method for a vehicle having an engine with a fuel injection valve and an automatic transmission with a torque converter having a lock-up clutch.

2. Description of the Related Art

Recently, toque converters provided in automatic transmissions are often provided with a lock-up clutch via which the input side (pump impeller side) and the output side (turbine runner side) of the torque converter are directly coupled with each other when needed.

More specifically, when the lock-up clutch is applied, the input side (pump impeller side) and the output side (turbine runner side) of the toque converter are directly coupled with each other. When the lock-up clutch is released, on the other hand, the input side and the output side of the toque converter are decoupled from each other. Further, in some applications, "slip control" is performed in which the lock-up clutch is placed in a semi-applied state, which is a state between the applied state and the released state, so that the lock-up clutch slips.

This slip control is started in response to a predetermined condition (e.g., a condition defined by the vehicle speed and the accelerator opening) coining into effect. During the slip control, the power transfer state at the torque converter is controlled through feedback control that is executed based on the difference between the rotation speed of the pump impeller of the toque converter (corresponding to the engine speed) and the rotation speed of the turbine runner of the torque converter such that the application force of the lock-up clutch equals a required force.

Example states where the above-described slip control is executed will be briefly described in the following.

In general, when the vehicle is decelerating, fuel injection from the fuel injection valves is suspended in order to improve the fuel economy, and such fuel injection suspension is generally called "fuel-cut". Fuel-cut is normally canceled when the engine speed has decreased to or below a predetermined threshold.

If the lock-up clutch of the torque converter is in the released state when the vehicle is decelerating as described above, it causes a loss of torque (rotational force) transferred from the output side to the input side of the torque converter, resulting in a decrease in the engine brake force. In such a case, therefore, the engine brake force is increased by maintaining the lock-up clutch in the applied state.

If the fuel-cut is started as the vehicle continues to decelerate in the state described above, due to the increased engine brake force, the engine speed and the vehicle speed sharply drop, and the engine speed reaches the threshold for canceling the fuel-cut within a relatively short time, and therefore the fuel economy improving effect by the fuel-cut is low.

One option to cope with this issue may be to extend the fuel-cut duration by lowering the threshold for canceling the fuel-cut. However, if the threshold is lowered excessively, it increases the possibility of engine stall and therefore it is not desirable.

In view of this, technologies have been proposed in which the slip control of the lock-up clutch is executed during the fuel-cut so as to slow the decrease in the engine speed so that it takes longer for the engine speed to decrease down to the threshold for canceling the fuel-cut (For example, refer to Japanese patent application publications No. 06-174074 (JP-A-06-174074), No. 06-193491 (JP-A-06-193491), and No. 2005-009510 (JP-A-2005-009510)).

Moreover, technologies have been proposed in which, in order to further extend the fuel-cut duration, so-called coast-downshift control is executed during the slip control of the lock-tip clutch (For example, refer to Japanese patent application publications No. 2003-074695 (JP-A-2003-074695) and No. 2000-154742 (JP-A-2000-154742)). In the coast-downshift control, the automatic transmission is downshifted at an engine speed (coast-downshift threshold) that is set slightly higher than the threshold for canceling the fuel-cut, so that the fuel-cut duration extends.

When the transmission speed to which the automatic transmission is to be downshifted as a coast-downshift is lower than a coast-downshift lower limit transmission speed that is set in advance, execution of the coast-downshift is prohibited and the fuel-cut and the slip control of the lock-up clutch are discontinued.

The coast-downshift lower limit transmission speed is set to a relatively high transmission speed to prevent the engine brake force from becoming too large. That is, the coast-downshift is limited when the fuel-cut and the slip control are being executed.

Thus, because the decrease in the engine speed is slowed by the slip control of the lock-up clutch and the coast-downshift threshold is set higher than the fuel-cut cancellation threshold, the fuel-cut continues even after the automatic transmission is downshifted. As such, the fuel-cut duration extends and the fuel economy improves accordingly.

Although it is true that the control method described above extends the fuel-cut duration during deceleration of the vehicle, it still has room for further improvements as follows.

For example, when the vehicle is traveling on a downhill road, not a flat road, the larger the downhill gradient of the downhill road, the smaller the deceleration of the vehicle becomes, and even in this case, after the automatic transmission has been downshifted to the coast-downshift lower limit transmission speed during the coast-downshift control, the fuel-cut and the slip control of the lock-up clutch are discontinued and the fuel supply resumes, which eliminates the feeling of deceleration and reduces the fuel improving effect.

SUMMARY OF THE INVENTION

The invention provides a vehicle control apparatus and a vehicle control method for a vehicle having an engine with a feel injection valve and an automatic transmission with a torque converter having a lock-up clutch. The vehicle control apparatus and the vehicle control method of the invention improve the fuel economy and provide a good vehicle driveability by ensuring modest engine deceleration of the vehicle.

A first aspect of the invention relates to a vehicle control apparatus for a vehicle having an engine with a fuel injection valve and an automatic transmission with a torque converter having a lock-up clutch. The vehicle control apparatus includes: a fuel-cut management portion that executes a fuel-cut by suspending fuel injection from the fuel injection valve during deceleration of the vehicle and cancels the fuel-cut and restarts the fuel injection from the fuel injection valve when the engine speed of the engine has decreased to a first threshold; a first fuel-cut duration extending portion that, during the fuel-cut, slows the decrease in the engine speed by executing a slip control of the lock-up clutch; and a second fuel-cut duration extending portion that, when the engine speed has decreased to a second threshold that is higher by a given amount than the first threshold while the fuel-cut and the slip control are being executed, determines whether the road on which the vehicle is presently traveling has a downhill gradient that is large enough to maintain the engine in a driven state after the automatic transmission is downshifted; and that allows to downshift the automatic transmission if the road on which the vehicle is presently traveling is determined to have a downhill gradient that is large enough to maintain the engine in the driven state after the automatic transmission is downshifted.

According to this structure, when the vehicle is decelerating on a downhill road where the deceleration of the vehicle is smaller than when it is decelerating on a flat road, the larger the gradient angle of the downhill road, the lower transmission speed the coast-downshift is performed to, that is, the lower transmission speed the automatic transmission is downshifted to as the engine speed decreases.

In this case, because the vehicle is traveling on a downhill road, even if the automatic transmission is downshifted to a low transmission speed, unlike in the case where the vehicle is traveling on a flat road, the engine brake force does not become too large and the rate of decrease in the engine speed does not become too high, and thus the time to the cancellation of the fuel-cut extends.

As such, the above-described vehicle control apparatus ensures modest deceleration of the vehicle while extending the fuel-cut duration, causing none of a situation where the engine brake becomes too weak and thus the driver needs to brake the vehicle manually and a situation where the vehicle nose-dives due to too strong engine brake.

A second aspect of the invention relates to a method for controlling a vehicle having an engine with a fuel injection valve and an automatic transmission with a torque converter having a lock-up clutch. This method includes: executing a fuel-cut by suspending fuel injection from the fuel injection valve during deceleration of the vehicle and canceling the fuel-cut and restarting the fuel injection from the fuel injection valve when the engine speed of the engine has decreased to a first threshold; slowing, during the fuel-cut, the decrease in the engine speed by executing a slip control of the lock-up clutch; and when the engine speed has decreased to a second threshold that is higher by a given amount than the first threshold while the fuel-cut and the slip control are being executed, determining whether the road on which the vehicle is presently traveling has a downhill gradient that is large enough to maintain the engine in a driven state after the automatic transmission is downshifted, and allowing to downshift the automatic transmission if the road on which the vehicle is presently traveling is determined to have a downhill gradient that is large enough to maintain the engine in the driven state after the automatic transmission is downshifted.

Accordingly, the invention improves the fuel economy by extending the fuel-cut duration and provides a good vehicle driveability by ensuring modest deceleration of the vehicle during deceleration of the vehicle.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE EMBODIMENTS

Hereinafter, an example embodiment of the invention will be described with reference to FIG. 1 to FIG. 8.

Prior to describing a vehicle control apparatus of the example embodiment, a vehicle power train incorporating the vehicle control apparatus will be described.

Figure 1:
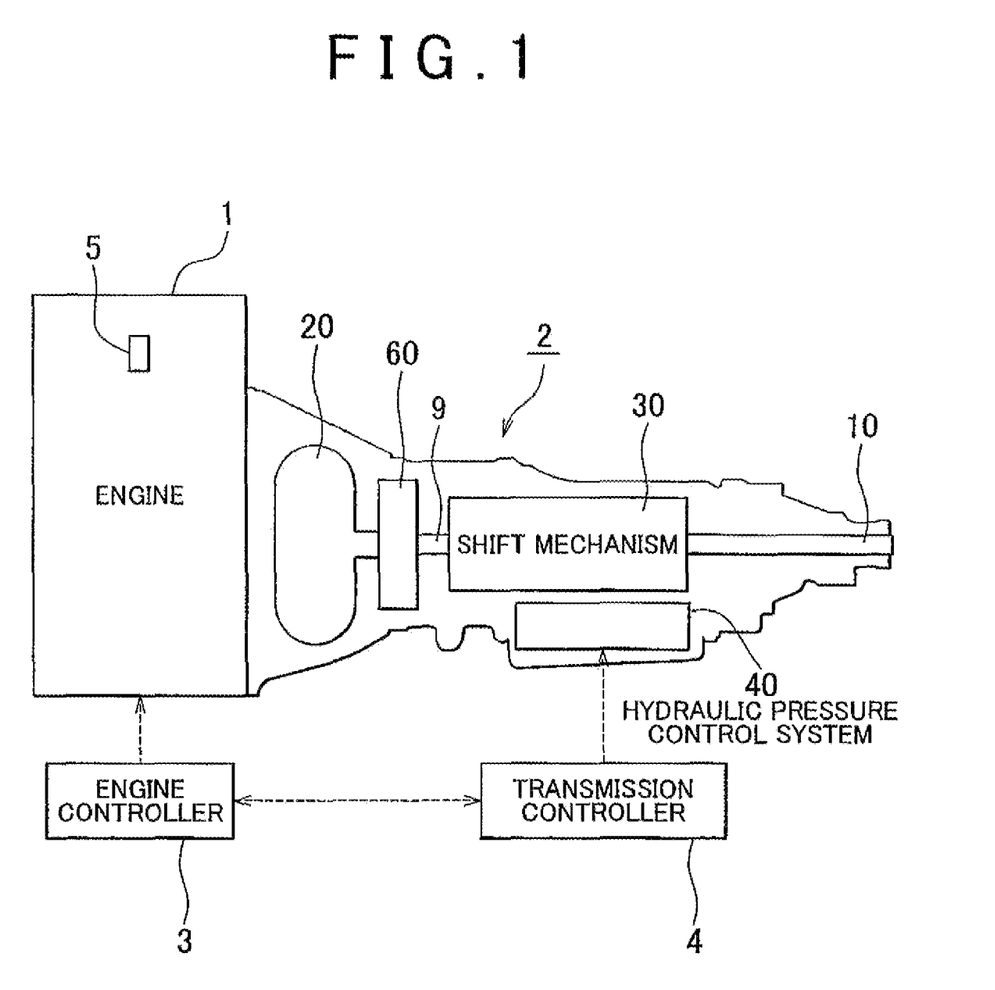
FIG. 1 is a view schematically showing the configuration of a vehicle power train incorporating a vehicle control apparatus according to an example embodiment of the invention.
Figure 2:
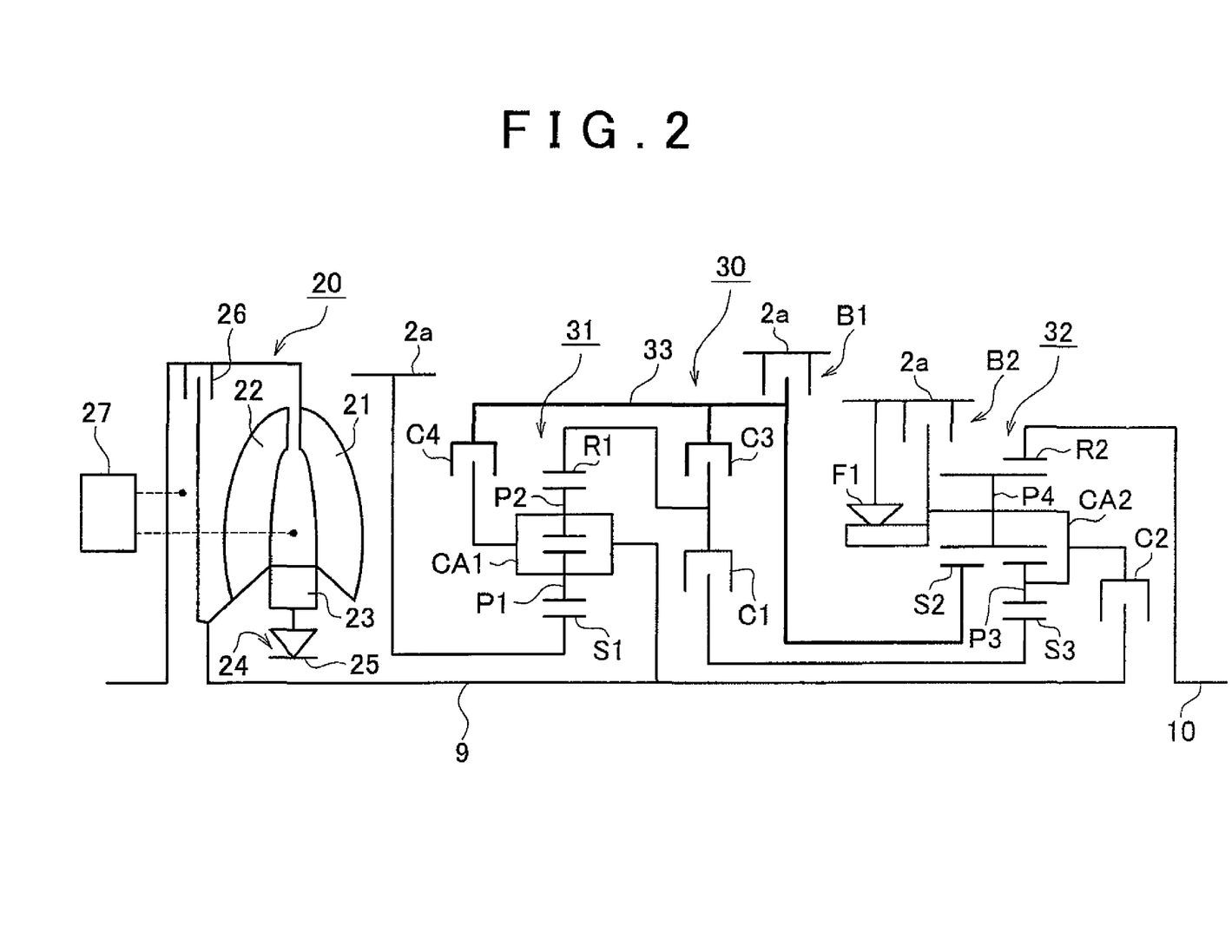
FIG. 2 is a skeleton view illustrating the structure of the automatic transmission shown FIG. 1.
Figure 3:
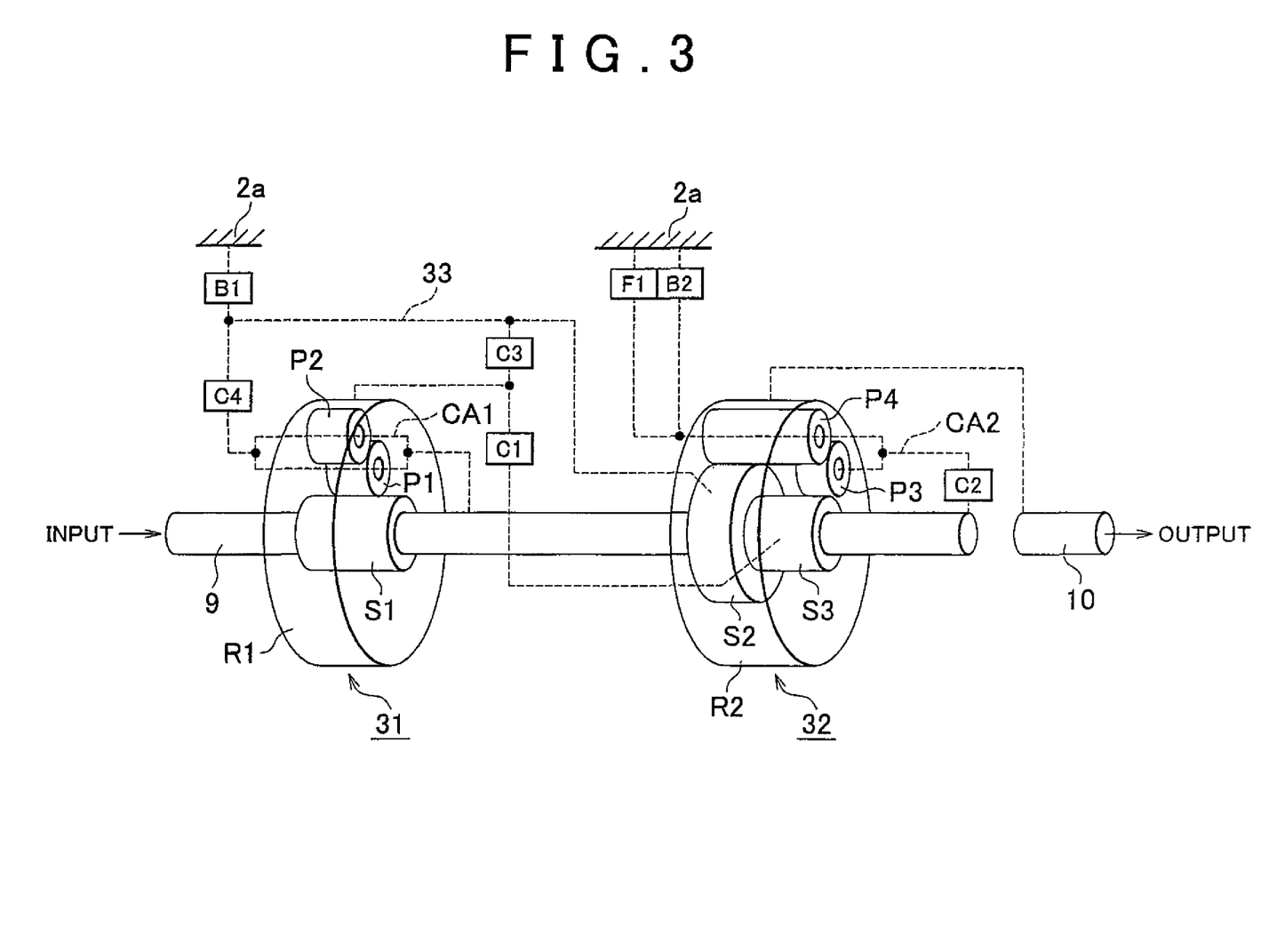
FIG. 3 is a perspective view schematically showing the structure of the shift mechanism shown in FIG. 2.

FIG. 1 is a view schematically showing the configuration of the vehicle power train incorporating the vehicle control apparatus of the example embodiment. FIG. 2 is a skeleton view illustrating an example structure of the automatic transmission shown FIG. 1. FIG. 3 is a perspective view schematically showing the structure of the shift mechanism shown in FIG. 1 and FIG. 2.

Referring, to FIG. 1, the power train is constituted of an engine 1, an automatic transmission 2, an engine controller 3, and a transmission controller 4.

The engine 1 produces rotational force by combusting air-fuel mixtures obtained by mixing the air drawn front the outside and the fuel injected from fuel injectors 5 at a given ratio. The fuel injection valves 5 are controlled by the engine controller 3.

The automatic transmission 2 is mainly constituted of a torque converter 20, a shift mechanism 30, a hydraulic pressure control system 40, and an oil pump 60. The automatic transmission 2 has eight forward speeds and one reverse speed.

Referring to FIG. 2, the torque converter 20, which is coupled with the engine 1, includes a pump impeller 21, a turbine runner 22, a stator 23, a one-way clutch 24, a stator shaft 25, and a lock-up clutch 26.

The stator 23 is supported by a case 2a of the automatic transmission 2 via the one-way clutch 24 that allows the stator 23 to rotate in only one directions. The inner race of the stator 23 is fixed on the case 2a of the automatic transmission 2 via the stator shaft 25.

The lock-up clutch 26 is used to directly couple the pump impeller 21 and the turbine runner 22 of the torque converter 20. That is, the state of the lock-up clutch 26 is switched, as needed, between an applied state where the pump impeller 21 (input side) and the turbine runner 22 (output side) are directly coupled with each other, a released state where the pump impeller 21 and the turbine runner 22 are not coupled with each other, and a semi-applied state that is a state between the applied state and the released state.

The application force of the lock-up clutch 26 is controlled by controlling the hydraulic pressure to be applied to the pump impeller 21 (input side) and the hydraulic pressure to be applied to the turbine runner 22 (output side) using a lock-up control valve 27.

Rotational force is input to an input shaft 9 from the torque converter 20, and its rotation speed is changed as needed at the shift mechanism 30 and then output to an output shaft 10. As shown in FIG. 2 and FIG. 3; the shift mechanism 30 is constituted of a from planetary gearset 31, a rear planetary gearset 32, an intermediate drum 33, a first clutch C1 to a fourth clutch C4, a first brake B1, and a second brake B2.

The front planetary gearset 31 is a so-called double-pinion type planetary gearset having a first sun gear S1, a first ring gear R1, a plurality of inner pinions P1, a plurality of outer pinions P2, and a first carrier CA1.

The first sun gear S1 is fixed on the case 2a of the automatic transmission 2 and therefore it is not rotatable. The first ring gear R1 is supported by the intermediate drum 33 via the third clutch C3 such that the first ring gear R1 rotates together with or relative to the intermediate drum 33 depending upon the state of the third clutch C3. The first sun gear S1 is coaxially arranged on the inner peripheral side of the first ring gear R1.

Referring to FIG. 3, the inner pinions P1 and the outer pinions P2 are disposed in the annular space between the first sun gear S1 and the first ring gear R1. The inner pinions P1 are in mesh with the first sun gear S1 while the outer pinions P2 are in mesh with the inner pinions P1 and the first ring gear R1.

The pinions P1, P2 are rotatably supported on the first carrier CA1. The center shaft of the first carrier CA1 is coupled with the input shaft 9. The pinion shafts of the pinions P1, P2 on the first carrier CA1 are supported by the intermediate drum 33 via the fourth clutch C4 such that the pinions shafts revolve together with or relative to the intermediate drum 33 depending upon the state of the fourth clutch C4.

The intermediate drum 33 is rotatably arranged on the outer peripheral side of the first ring gear R1, and the intermediate drum 33 is supported by the case 2a of the automatic transmission 2 via the first brake B1 such that the intermediate drum 33 remains stationary or rotates relative to the case 2a depending upon the state of the first brake B1.

The rear planetary gearset 32 is a so-called ravigneaux type planetary gearset having a second sun gear S2 having a large diameter, a third sun gear S3 having a small diameter, a second ring gear R2, a plurality of short pinions P3, a plurality of long pinions P4, and a second carrier CA2.

The second sun gear 52 is coupled with the intermediate drum 33. The third sun gear S3 is coupled with the first ring gear R1 of the front planetary gearset 31 via the first clutch C1 such that the third sun gear S3 rotates together with or relative to the first ring gear R1 depending upon the state of the first clutch C1. The second ring gear R2 is coupled with the output shaft 10.

The short pinions P3 are in mesh with the third sun gear S3, and the long pinions P4 are in mesh with the second sun gear S2 and the second ring gear R2 and also in mesh with the third sun gear S3 via the short pinions P3.

The short pinions P3 and the long pinions P4 are rotatably supported on the second carrier CA2. The center shaft of the second carrier CA2 is coupled with the input shaft 9 via the second clutch C2. The pinions shafts of the pinions P3, P4 on the second carrier CA2 are supported by the case 2a of the automatic transmission 2 via the second brake B2 and a one-way clutch F1.

The first clutch C1 to the forth clutch C4, the first brake B1, and the second brake B2 are a wet-type multi-plate friction coupling device using an oil viscosity.

When the first clutch C1 is in the applied state, the third sun gear S3 of the rear planetary gearset 32 rotates together with the first ring gear R1 of the front planetary gearset 31. When the first clutch C1 is in the released state, on the other hand, the third sun gear S3 of the rear planetary gearset 32 rotates relative to the first ring gear R1 of the front planetary gearset 31.

When the second clutch C2 is in the applied state, the second carrier CA2 of the rear planetary gearset 32 rotates together with the input shaft 9. When the second clutch C2 is in the released state, on the other hand, the second carrier CA2 of the rear planetary gearset 32 rotates relative to the input shaft 9.

When the third clutch C3 is in the applied state, the first ring gear R1 of the front planetary gearset 31 rotates together with the intermediate drum 33. When the third clutch C3 is in the released state, on the other hand, the first ring gear R1 of the front planetary gearset 31 rotates relative to the intermediate drum 33.

When the fourth clutch C4 is in the applied state, the first carrier CA1 of the front planetary gearset 31 rotates together with the intermediate drum 33. When the fourth clutch C4 is in the released state, on the other hand, the first carrier CA1 of the front planetary gearset 31 rotates relative to the intermediate drum 33.

When the first brake B1 is in the applied state, the intermediate drum 33 is coupled with the case 2a of the automatic transmission 2 and thus it remains stationary. When the first brake B1 is in the released state, on the other hand, the intermediate drum 33 rotates relative to the case 2a of the automatic transmission 2.

When the second brake B2 is in the applied state, the second carrier CA2 of the rear planetary gearset 32 is coupled with the case 2a of the automatic transmission 2 and it remains stationary. When the second brake B2 is in the released state, on the other hand, the second carrier CA2 of the rear planetary gearset 32 rotates relative to the case 2a of the automatic transmission 2.

The one-way clutch F1 allows the second carrier CA2 of the rear planetary gearset 32 to rotate only in one direction.

Figure 4:
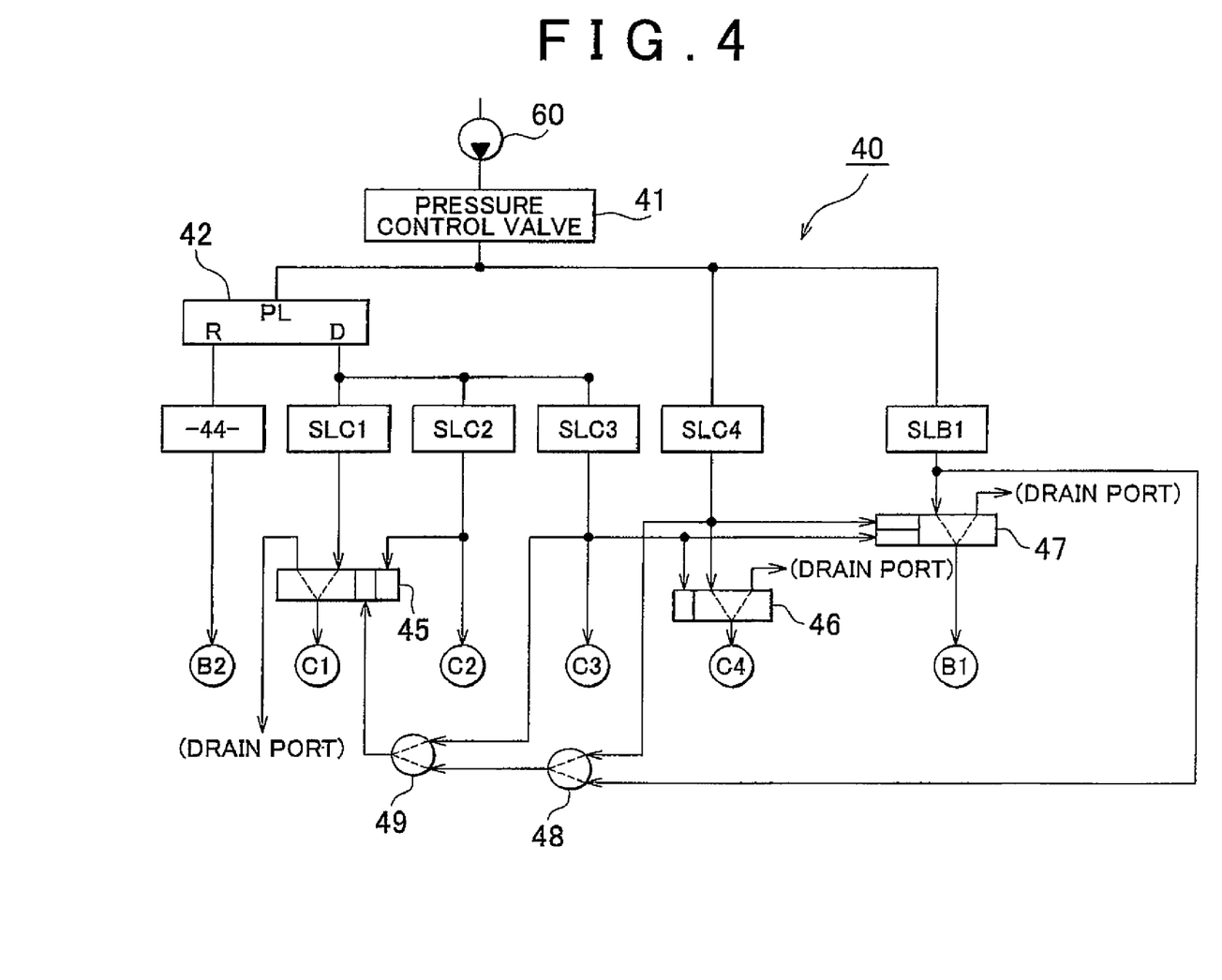
FIG. 4 is a view showing the structure of the hydraulic control system of the automatic transmission shown in FIG. 1.

The hydraulic pressure control system 40 is provided to control the shift operation of the shift mechanism 30. Referring to FIG. 4, the hydraulic pressure control system 40 is mainly constituted of a pressure control valve 41, a manual valve 42, a plurality of linear solenoid valves SLC1, SLC2, SLC3, SLC4, and SLB1, a B2 control valve 44, cut-off valves 45, 46, 47 each serving as a fail-safe valve, switch valves 48, 49, etc.

The pressure control valve 41 adjusts the hydraulic pressure of the oil pump 60 to a given line pressure and supplies it to a port PL of the manual valve 42, the linear solenoid valves SLC4 and SLB1.

The manual valve 42 produces hydraulic pressures to the linear solenoid valves SLC1, SLC2, and SLC3, respectively, via the port D and to the B2 control valve 44 via the port R so as to establish the neutral range N, the forward drive range D, or the reverse drive range R in accordance with the shift lever operation by the driver.

The linear solenoid valves SLC1, SLC2, SLC3 SLC4, and SLB1 are used to drive the first clutch C1 to the fourth clutch C4 and the first brake B1, respectively. Because the basic structure of each solenoid valve is a known structure, its detailed graphic illustration and description are omitted in this specification.

The reference codes "SLC1", "SLC2", "SLC3", "SLC4", and "SLB1" of the respective linear solenoid valves are each made by putting the reference code of the corresponding hydraulic apply device (the first clutch C1 to the fourth clutch C4 and the first brake B1) after "SL".

The solenoid (reference code omitted) of each liner solenoid valve SLC1, SLC2, SLC3, SLC4, and SLB1 is activated by the control signals (control current) from the transmission controller 4 and moves the valve element (not shown in the drawings) to the position at which the spring force of a compressed spring and the hydraulic pressure acting on the valve element are in equilibrium, whereby each valve port is closed and opened as needed or its opening degree is adjusted to a given degree.

The B2 control valve 44 drives the second brake B2.

The first cut-off valve 45 is provided between the first clutch C1 and the linear solenoid valve SLC1. When hydraulic pressure is supplied to the two input ports of the first cut-off valve 45, the first cut-off valve 45 interrupts the hydraulic pressure supplied from the linear solenoid valve SLC1 to the first clutch C1 via the output port of the first cut-off valve 45 and releases the interrupted hydraulic pressure into the case 2a of the automatic transmission 2 via the drain port of the first cut-off valve 45. Thus, the first cut-off valve 45 serves as a fail-safe valve.

The second cut-off valve 46 is provided between the fourth clutch C4 and the linear solenoid valve SLC4. When hydraulic pressure is supplied to the single input ports of the second cut-off valve 46 from the linear solenoid valve SLC3, the second cut-off valve 46 interrupts the hydraulic pressure supplied from the linear solenoid valve SLC4 to the fourth clutch C4 via the output port of the second cut-off valve 46 and releases the interrupted hydraulic pressure into the case 2a of the automatic transmission 2 via the drain port of the second cut-off valve 46. Thus, the second cut-off valve 46 serves as a fail-safe valve.

The third cut-off valve 47 is provided between the first brake B1 and the linear solenoid valve SLB1. When hydraulic pressure is supplied to either of the two input ports of the third cut-off valve 47 from the linear solenoid valve SLC3 or the linear solenoid valve SLC4, the third cut-off valve 47 interrupts the hydraulic pressure supplied from the linear solenoid valve SLB1 to the first brake B1 via the output port of the third cut-off valve 47 and releases the hydraulic pressure into the case 2a of the automatic transmission 2 via the drain port of the third cut-off valve 47. Thus, the third cut-off valve 47 serves as a fail-safe valve.

The switch valves 48, 49 are provided in series between the linear solenoid valve SLB1 and one of the input ports of the first cut-off valve 45.

A hydraulic pipe of the linear solenoid valve SLB1 and a hydraulic pipe of the linear solenoid valve SLC4 are connected, in parallel, to the two input ports of the first switch valve 48, respectively. An output pipe of the first switch valve 48 and a hydraulic pipe of the linear solenoid valve SLC3 are connected, in parallel, to the two input ports of the second switch valve 49, respectively. When hydraulic pressure is supplied to either of the two input ports of each switch valve 48, 49, the switch valve 48, 49 outputs the supplied hydraulic pressure from its output port.

The engine controller 3 and the transmission controller 4 are both ECUs (Electronic Control Units) having substantially the same hardware configuration as each other. The configuration of the transmission controller 4 will be described in detail below with reference to FIG. 5.

Figure 5:
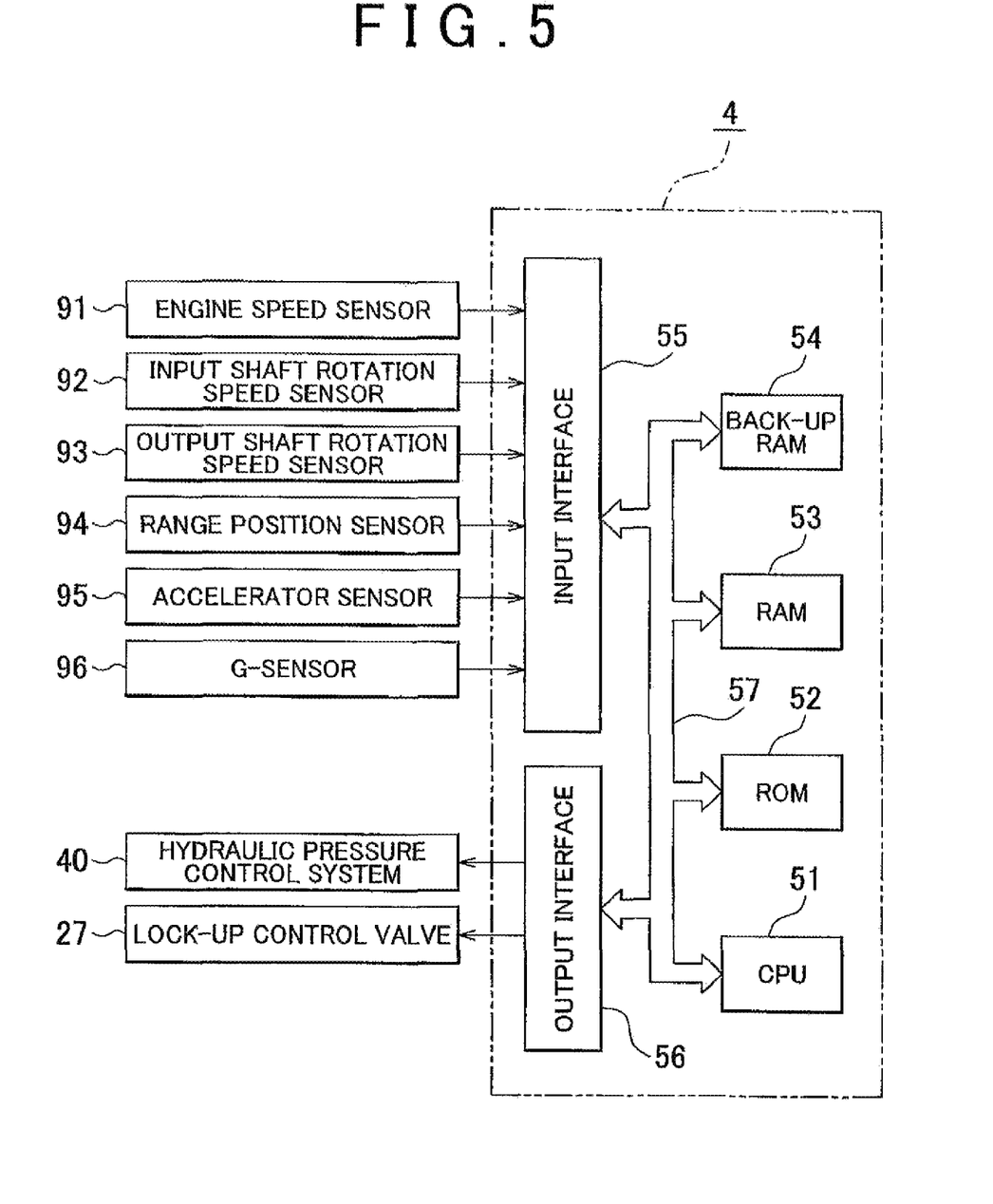
FIG. 5 is a view showing the structure of the transmission controller shown in FIG. 1.

The transmission controller 4 controls the hydraulic pressure control system 40 se as to establish a given transmission speed, that is, a given power transfer path at the shift mechanism 30.

More specifically, referring to FIG. 5, the transmission controller 4 is constituted of a central processing unit (CPU) 51, a read-only memory (ROM) 52, a random-access memory (RAM) 53, a back-up RAM 54, an input interface 55, and an output interface 56, which are all connected to each other via a bi-directional bus 57.

The CPU 51 executes various computations on various control programs and control maps stored in the ROM 52. Various control programs for controlling the shift operation of the shift mechanism 30 are stored in the ROM 52. The RAM 53 is used to temporarily store the results of computations by the CPU 51, various data input from the respective sensors, etc. The back-up RAM 54 is a non-volatile memory for storing various data that needs to be saved.

The input interface 55 is connected at least to an engine speed sensor 91, an input shaft rotation speed sensor 92, an output shaft rotation speed sensor 93, a range position sensor 94, an accelerator sensor 95, a G-sensor 96, etc. The output interface 56 is connected at least to the components of the hydraulic pressure control system 40 (the pressure control valve 41, the manual valve 42, the linear solenoid valves SLC1, SLC2, SLC3, SLC4, SLB1, the B2 control valve 44), the lock-up control valve 27 for controlling the hydraulic pressure to be supplied to the lock-up clutch 26, etc.

The engine speed sensor 91 detects the rotation speed of the pump impeller 21 of the torque converter 20, to which the rotation of the engine 1 is transferred, as the engine speed. The input shaft rotation speed sensor 92 detects the rotation speed of the input shaft 9. The output shaft rotation speed sensor 93 detects the rotation speed of the output shaft 10. The range position sensor 94 outputs detection signals when the manual valve 42 is at the drive range D and at the neutral range N. The accelerator sensor 95 detects the amount of the depression of the accelerator pedal. The G-sensor 96 detects the longitudinal and lateral accelerations of the vehicle.

The transmission controller 4 is connected to the engine controller 3 such that signals can be transmitted between them, and the transmission controller 4 obtains various information regarding the engine control from the engine controller 3 as needed.

Hereinafter, the conditions for establishing each transmission speed at the shift mechanism 30 will be described with reference to FIG. 6 and FIG. 7.

Figure 6:
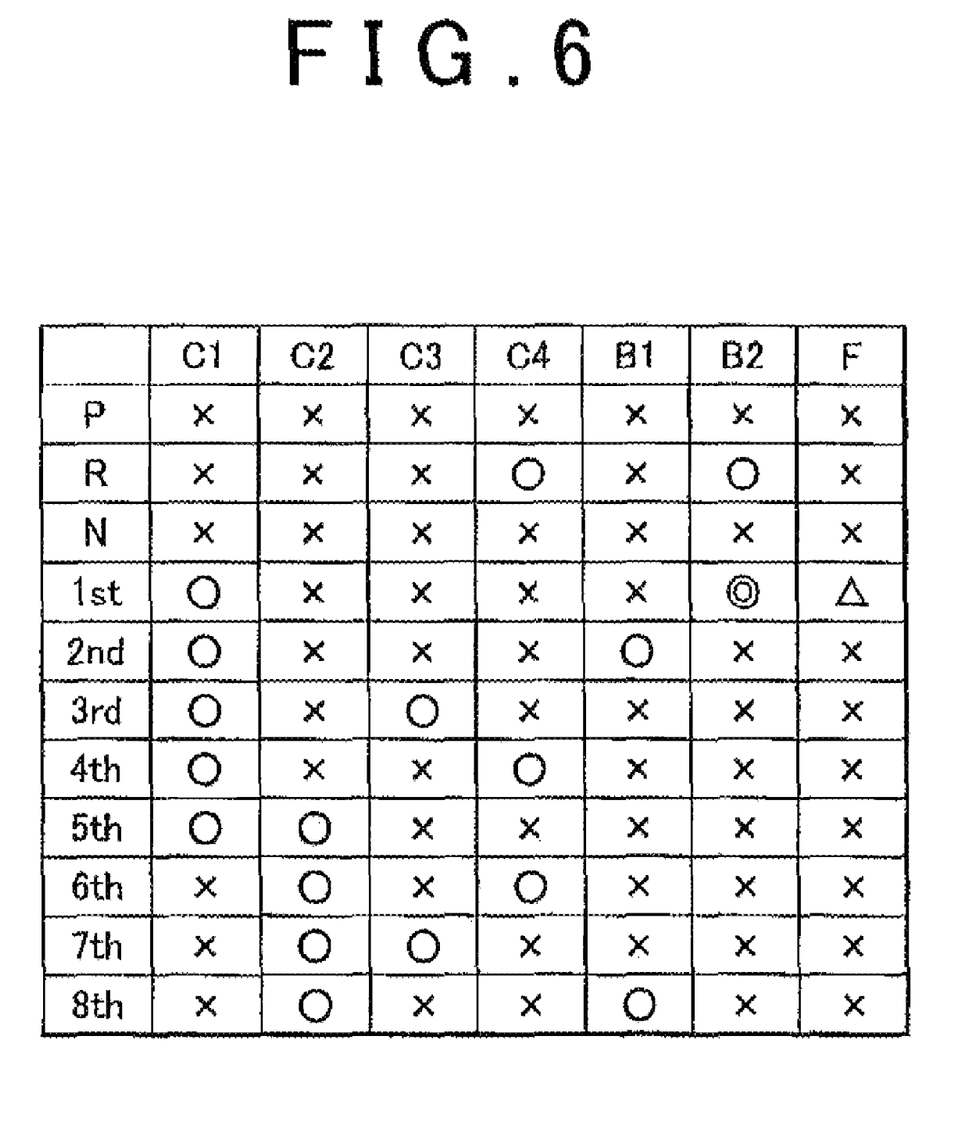
FIG. 6 is an application table indicating the application state of each clutch and brake of the shift mechanism shown in FIG. 2 at each transmission speed.

FIG. 6 is an application table indicating the application state of the first clutch C1 to the fourth clutch C4, the first brake B1, the second brake B2, and the one-way clutch F1 at each transmission speed. In this chart, the circles represent "applied", the crosses represent "released", the double circle represents "applied during engine brake", and the triangle represents "applied only during driving".

Figure 7:
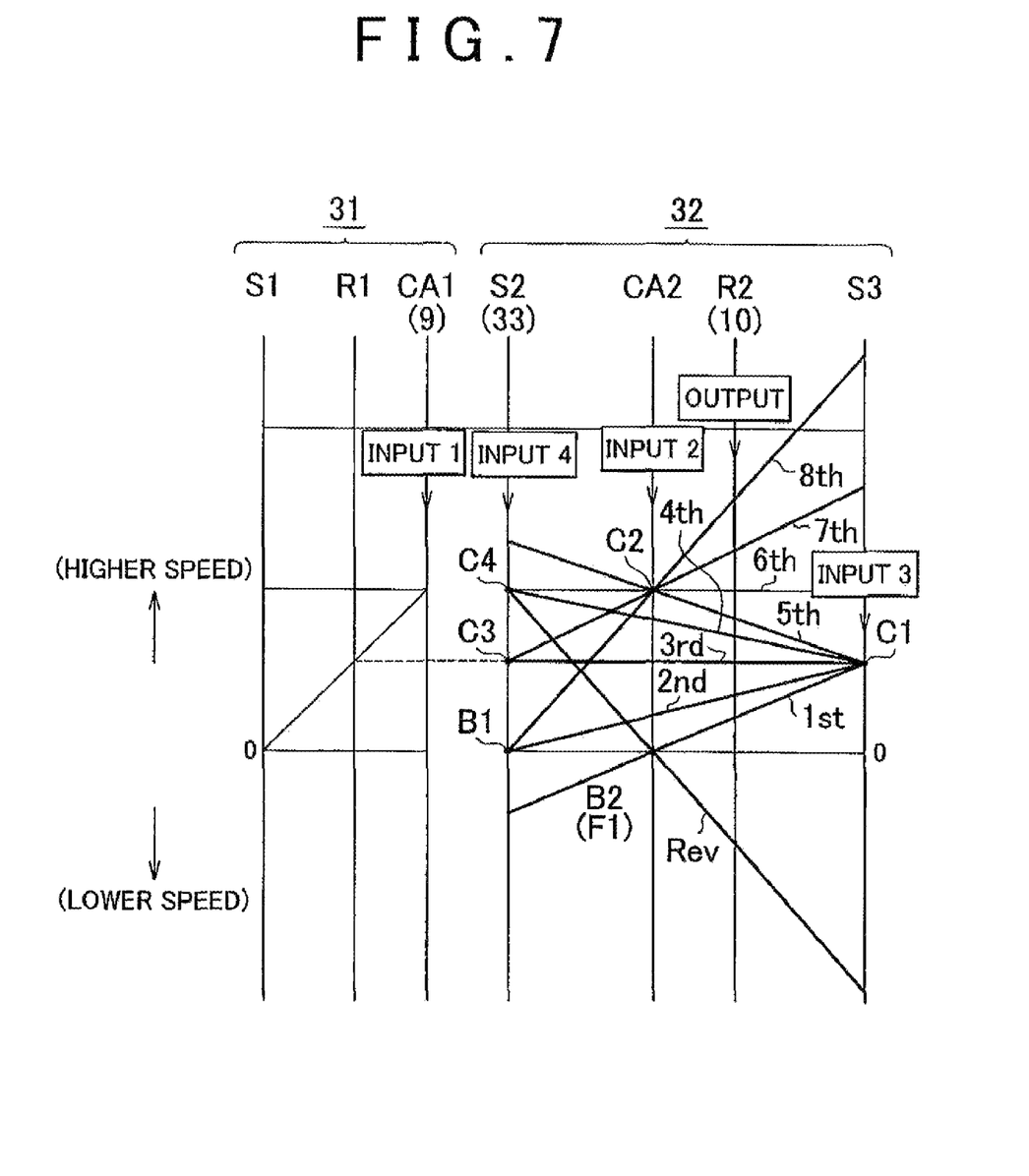
FIG. 7 is an alignment chart indicating the rotation speed ratio among the rotational elements of the two planetary gearsets at each transmission speed.

FIG. 7 is an alignment chart indicating the rotation speed ratio among the rotational elements of the front and rear planetary gearsets 31, 32 at each transmission speed (the first to eighth forward speed and the reverse speed) that is established by selectively applying the first clutch C1 to the fourth clutch C4, the first brake B1, the second brake B2, and the one-way clutch F1.

In FIG. 7, the vertical axes represent the rotation speed ratio among the respective rotational elements, and the intervals between the vertical axes correspond to the rotation speed ratios among the rotational elements. Note that "C1", "C2", "C3", "C4", "B1", "B2", are "F1" in FIG. 7 represent the points at which the first clutch C1 to the fourth clutch C4, the first brake B1, the second brake B2, and the one-way clutch F1 are applied, respectively.

Further, in FIG. 7, "INPUT 1" to "INPUT 4" represent the points to which the rotational force is input from the input shaft 9, and "OUTPUT" represents the point from which the rotational force is output to the output shaft 10.

Next, the vehicle control apparatus of this example embodiment of the invention will be described in detail with reference to FIG. 8.

In this example embodiment, when a coast-downshift of the automatic transmission 2 needs to be performed while the vehicle is decelerating in the drive range D with the fuel-cut and the slip control of the lock-up clutch 26 being executed, in order to continue the fuel-cut and the slip control of the lock-up clutch 26 as long as possible, the automatic transmission 2 is downshifted even to a transmission speed lower than a coast-downshift lower limit transmission speed, which is the lowest transmission speed to which the automatic transmission is allowed to be downshifted as a coast-downshift, if the vehicle is presently traveling (will be simply referred to as "present road") has a downhill gradient that is equal to or larger than a predetermined value.

The coast-downshift lower limit transmission speed is empirically set to a given transmission speed. In an example for empirically setting the coast-downshift lower limit transmission speed, the vehicle is decelerated on a flat road at each transmission speed so that the fuel-cut and the slip control of the lock-up clutch 26 are executed and each resultant deceleration of the vehicle is obtained, and then the coast-downshift lower limit transmission speed is set based on the obtained decelerations.

In the case of an automatic transmission having eight forward drive speeds like the automatic transmission 2 of this example embodiment, the coast-downshift lower limit transmission speed can be set to, for example, the fifth speed (5th). However the coast-downshift lower limit transmission speed may be set to an arbitral transmission speed according to the number of the transmission speeds, the speed ratio at each transmission speed, and so on.

Hereinafter, the control procedure executed by the transmission controller 4 will be described in detail with reference to the flowchart shown in FIG. 8.

Figure 8:
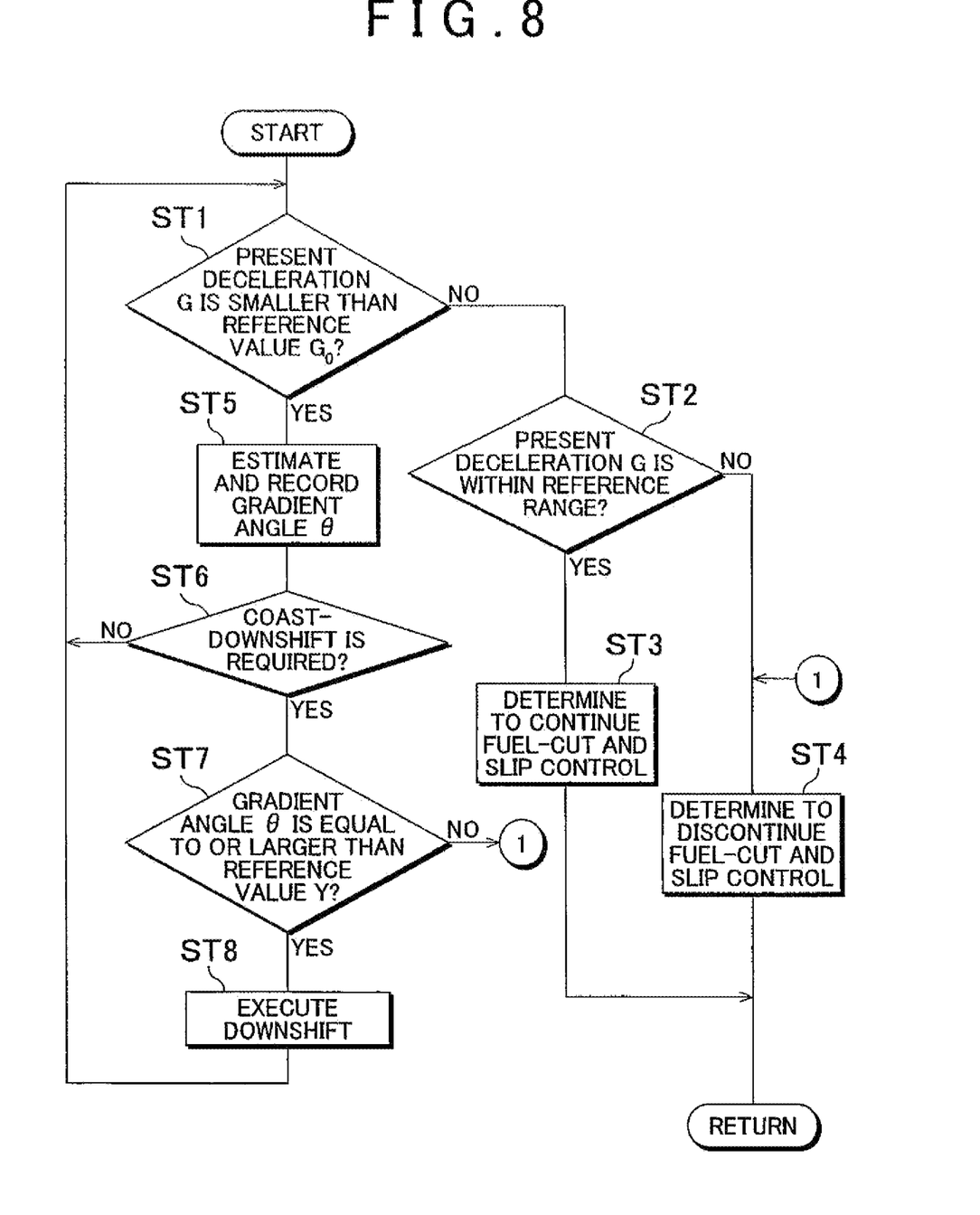
FIG. 8 is a flowchart illustrating the operation of the vehicle control apparatus of the example embodiment.

The control routine illustrated in the flowchart in FIG 8 is executed as a sub-routine in the fuel-cut routine and the slip control routine (main routines). This sub-routine is started, for example, when the fuel-cut and the slip control of the lock-up clutch 26 are being executed at the coast-downshift lower limit transmission speed (e.g., the 5th speed).

The procedures for executing the fuel-cut and the slip control of the lock-up clutch 26 when the vehicle is decelerating with the accelerator pedal fully released may be those known in the art, such as those described in Japanese Patent Application Publication No. 2003-074695 (JP-A-2003-074695). Therefore, they are not described in detail in this specification.

The engine controller 3 controls the start and cancellation of the fuel-cut in accordance with given commands transmitted from the transmission controller 4. Thus, the engine controller 3 and the transmission controller 4 together serve as "fuel-cut management portion". The slip control of the lock-up clutch 26 is controlled by the transmission controller 4, and thus the transmission controller 4 serves as "first fuel-cut duration extending portion".

Besides, the processes in the respective steps of the flowchart of FIG. 8, which will be described below, correspond to the processes executed by "second fuel-cut duration extending portion". Thus, the transmission controller 4 that executes the routine of the flowchart of the FIG. 8 serves as the "second fuel-cut duration extending portion". As such, the vehicle control apparatus of this example embodiment is constituted of the engine controller 3 and the transmission controller 4.

Referring to FIG. 8, after the start of the routine, in step ST1, the deceleration G of the vehicle is determined based on the output of the G-sensor 96, and then whether the determined deceleration G is smaller than a reference value $G_0$.

That is, in step ST1, it is determined whether the present road is a flat road (including small gradient downhill roads), an uphill road, or a downhill road having a gradient equal to or larger than a predetermined value. Therefore, the reference value $G_0$ is set by adding a given tolerance to a value that has been empirically obtained by examining the deceleration of the vehicle when it is traveling on a flat road under the same condition as that for starting the routine shown in FIG. 8. The tolerance is added to determine downhill roads having a small gradient angle θ as a flat road.

If "NO" is obtained in step ST1, it is determined that the present road is a flat road (including small gradient downhill roads) or an uphill road, and therefore the control proceeds to step ST2 to step ST4. On the other hand, if "YES" is obtained in step ST1, it is determined that the present road is a downhill road having a gradient angle θ that is equal to or larger than a reference angle, and the control proceeds to step ST5 to step ST8.

First, the processes in step ST2 to step ST4 will be described. In step ST2, it is determined whether the deceleration G detected by the G-sensor 96 in step ST1 is within a reference range. That is, in step ST2, it is determined whether the present road is a flat road (including small gradient downhill roads) or an uphill road. The predetermined range is empirically set in consideration of the above.

If the deceleration G is within the reference range, the present road is determined to be a flat road (including small degree downhill roads). In this case, therefore, "YES" is obtained in step ST2, after which the control proceeds to step ST3.

In step ST3, it is determined to continue the fuel-cut and the slip control of the lock-up clutch 26. Then, the control exits this sub-routine and returns to the main routines for the fuel-cut and the slip control of the lock-up clutch 26 and continues the fuel-cut and the slip control of the lock-tip clutch 26.

On the other hand, if the deceleration G is out of the reference range, the present road is determined to be an uphill road. In this case, therefore, "NO" is obtained in step ST2 and the control proceeds to step ST4.

In step ST4, it is determined not to continue the fuel-cut and the slip control of the lock-tip clutch 26. Then, the control exits this sub-routine and returns to the main routines for the fuel-cut and the slip control of the lock-up clutch 26 and discontinues the fuel-cut and the slip control of the lock-up clutch 26.

Next, the processes in step ST5 to step ST8 will be described. First, in step ST5, the gradient angle θ of the downhill road on which the vehicle is presently traveling is estimated, and the estimated gradient angle θ is recorded in, for example, the RAM 53.

The gradient angle θ can be estimated by, for example, applying the deceleration G detected by the G-sensor 96 in step ST1 to a reference map defining the relation between vehicle deceleration and downhill gradient. The reference map is empirically formulated in consideration of the above.

Then, it is determined in step ST6 whether a coast-downshift of the automatic transmission 2 needs to be performed.

In step ST6, that is, it is determined whether the engine speed has decreased to a coast-downshift threshold X.

The coast-downshift threshold X is set larger than the threshold (engine speed) for canceling the fuel-cut. However, it may be set to an arbitral value. This fuel-cut cancellation threshold is set to an engine speed that is high enough to prevent engine stall during the fuel-cut.

If the engine speed has not yet decreased to the coast-downshift threshold X, "NO" is obtained in step ST6, after which the control returns to step ST1. On the other hand, if the engine speed has decreased to the coast-downshift threshold X, "YES" is obtained in step ST6, and the control proceeds to step ST7.

In step ST7, the gradient angle θ recorded in step ST5 is read out and it is then determined whether the gradient angle θ is larger than a reference value Y. In step ST7, that is, it is determined whether the downhill gradient of the downhill road on which the vehicle is presently traveling is large enough to maintain the engine 1 in a driven state after the automatic transmission 2 is downshifted. The reference value Y is empirically set in consideration of the above.

The "driven state" of the engine 1 refers to a state where engine brake is applied to the vehicle (e.g., a state where the engine 1 is driven by the rotational force of the wheels of the vehicle).

If the gradient angle θ is smaller than the reference value Y, that is, if the present road is a downhill load having a relatively small downhill gradient, "NO" is obtained in step ST7 and downshift is prohibited. Then, the control exits this sub-routine and returns to the main routines for the fuel-cut and the slip control of the lock-up clutch 26 and discontinues the fuel-cut and the slip control of the lock-up clutch 26.

As such, excessive engine brake is prevented, and the vehicle can be prepared to accelerate with a good response when it is required the next time.

On the other hand, if the gradient angle θ is equal to or larger than the reference value Y, that is, if the downhill gradient of the downhill road on which the vehicle is presently traveling is larger than the predetermined value, "YES" is obtained in step ST7, and then in step ST8, the hydraulic pressure control system 40 is driven to downshift the automatic transmission 2, whereby moderate engine brake continues to be applied to the vehicle and the fuel-cut duration extends accordingly.

Then, the control returns to step ST1, and the above-described processes are repeated.

As described above, in the example embodiment described above, when it is determined that a coast-downshift of the automatic transmission 2 needs to be performed while the fuel-cut and the slip control of the lock-up clutch 26 are being executed, if the present road is a downhill road on having a downhill gradient equal to or larger than a predetermined value, the required coast-downshift is performed so that the fuel-cut and the slip control of the lock-up clutch 26 continue. On the other hand, if the present road is a downhill road on having a downhill gradient smaller than the predetermined value, the coast-downshift is prohibited and the fuel-cut and the slip control of the lock-up clutch 26 are discontinued.

As such, when the present road is a downhill road having a downhill gradient equal to or larger than the predetermined value, the automatic transmission 2 is downshifted even to a transmission speed lower than the coast-downshift lower limit transmission speed so that the fuel-cut and the slip control of the lock-up clutch 26 continue. Thus, the fuel-cut duration can be extended while ensuring, that modest engine brake (deceleration force) continues to be applied to the vehicle. Therefore, the fuel economy improves, and proper vehicle deceleration is obtained, resulting in a good vehicle driveability.

Further, when the vehicle is traveling on a downhill road having a downhill gradient smaller than the predetermined value, excessive engine brake is prevented, and the vehicle is prepared to accelerate with a good response when it is required the next time.

The invention is not limited to the foregoing example embodiment and construction. To the contrary, the invention is intended to cover various modifications and equivalent arrangements.

While the shift mechanism 30 includes at least two planetary gearsets in the foregoing example embodiment, various other gear mechanisms using multiple gears, belt-drive continuously variable transmissions, etc., may alternatively be used. Further, while the shift mechanism 30 has eight forward drive speeds and one reverse drive speed, the number of transmission speeds is not limited to any specific number.

What is claimed is:

1. A vehicle control apparatus fox a vehicle having an engine with a fuel injection valve and an automatic transmission with a torque converter having a lock-tip clutch, the vehicle control apparatus comprising:
   a fuel-cut management portion that executes a fuel-cut by suspending fuel injection from the fuel injection valve during deceleration of the vehicle and cancels the fuel-cut and restarts the fuel injection from the fuel injection valve when the engine speed of the engine has decreased to a first threshold;
   a first fuel-cut duration extending portion that, during the fuel-cut, slows the decrease in the engine speed by executing a slip control of the lock-up clutch; and
   a second fuel-cut duration extending portion that: when the engine speed has decreased to a second threshold that is higher by a given amount than the first threshold while the fuel-cut and the slip control are being executed, determines whether the road on which the vehicle is presently traveling has a downhill gradient that is large enough to maintain the engine in a driven state after the automatic transmission is downshifted; and that allows to downshift the automatic transmission if the road on which the vehicle is presently traveling is determined to have a downhill gradient that is large enough to maintain the engine in the driven state after the automatic transmission is downshifted.

2. The vehicle control apparatus according to claim 1, wherein if the road on which the vehicle is presently traveling does not have a downhill gradient that is large enough to maintain the engine in the driven state after the automatic transmission is downshifted, the second fuel-cut duration extending portion prohibits the downshifting of the automatic transmission and discontinues the fuel-cut and the slip control.

3. The vehicle control apparatus according to claim 1, further comprising:
   a G-sensor that detects the longitudinal and lateral accelerations of the vehicle, wherein:
   the second fuel-cut duration extending portion estimates the gradient of the road on which the vehicle is presently traveling based on the accelerations detected by the G-sensor.

4. The vehicle control apparatus according to claim 3, wherein:
   the second fuel-cut duration extending portion obtains a deceleration of the vehicle from the accelerations detected by the G-sensor; and the second fuel-cut duration extending portion determines that the road on which the vehicle is presently traveling has a downhill gradient large enough to maintain the engine in the driven state after the automatic transmission is downshifted, when the obtained deceleration of the vehicle is smaller than a reference value and the engine speed is equal to or lower than the second threshold while the fuel-cut and the slip control are being executed.

5. The vehicle control apparatus according to claim 4, wherein if the obtained deceleration of the vehicle is equal to or larger than the reference value and is out of a predetermined range, the second fuel-cut duration extending portion discontinues the fuel-cut and the slip control.

6. A method for controlling a vehicle having an engine with a fuel injection valve and an automatic transmission with a torque converter having a lock-up clutch, the method comprising:

executing a fuel-cut by suspending fuel injection from the fuel injection valve during deceleration of the vehicle and canceling the fuel-cut and restarting the fuel injection from the fuel injection valve when the engine speed of the engine has decreased to a first threshold;

slowing, during the fuel-cut, the decrease in the engine speed by executing a slip control of the lock-up clutch; and when the engine speed has decreased to a second threshold that is higher by a given amount than the first threshold while the fuel-cut and the slip control are being executed, determining whether the road on which the vehicle is presently traveling has a downhill gradient that is large enough to maintain the engine in a driven state after the automatic transmission is downshifted, and allowing to downshift the automatic transmission if the road on which the vehicle is presently traveling is determined to have a downhill gradient that is large enough to maintain the engine in the driven state after the automatic transmission is downshifted.

7. The method according to claim 6, wherein if the road on which the vehicle is presently traveling does not have a downhill gradient that is large enough to maintain the engine in the driven state after the automatic transmission is downshifted, the downshifting of the automatic transmission is prohibited and the fuel-cut and the slip control are discontinued.

8. The method according to claim 6, wherein:
   the vehicle includes a G-sensor that detects the longitudinal and lateral accelerations of the vehicle, and
   the gradient of the road on which the vehicle is presently traveling is estimated based on the accelerations detected by the G-sensor.

9. The method according to claim 8, wherein:
   a deceleration of the vehicle is obtained from the accelerations detected by the G-sensor; and
   it is determined that the road on which the vehicle is presently traveling has a downhill gradient that is large enough to maintain the engine in the driven state after the automatic transmission is downshifted, when the obtained deceleration of the vehicle is smaller than a reference value and the engine speed is equal to or lower than the second threshold while the fuel-cut and the slip control are being executed.

10. The method according to claim 9, wherein if the obtained deceleration of the vehicle is equal to or larger than the reference value and is out of a predetermined range, the fuel-cut and the slip control are discontinued.

* * * * *